(12) United States Patent
Feng et al.

(10) Patent No.: US 12,513,168 B2
(45) Date of Patent: Dec. 30, 2025

(54) MECHANISM FOR IDENTIFYING COLLUSIVE ATTACKERS

(71) Applicant: Nokia Solutions and Networks Oy, Espoo (FI)

(72) Inventors: Jingyu Feng, Xi'an (CN); Guangyue Lu, Shaanxi (CN); Shaoqing Lv, Xi'an (CN)

(73) Assignee: NOKIA SOLUTIONS AND NETWORKS OY, Espoo (FI)

(*) Notice: Subject to any disclaimer, the term of this patent is extended or adjusted under 35 U.S.C. 154(b) by 713 days.

(21) Appl. No.: 17/616,724

(22) PCT Filed: Jun. 12, 2019

(86) PCT No.: PCT/CN2019/090960
§ 371 (c)(1),
(2) Date: Dec. 6, 2021

(87) PCT Pub. No.: WO2020/248170
PCT Pub. Date: Dec. 17, 2020

(65) Prior Publication Data
US 2022/0303292 A1   Sep. 22, 2022

(51) Int. Cl.
*H04L 9/40* (2022.01)
*H04L 67/10* (2022.01)
*H04L 67/50* (2022.01)

(52) U.S. Cl.
CPC ...... *H04L 63/1425* (2013.01); *H04L 63/1416* (2013.01); *H04L 67/10* (2013.01); *H04L 67/535* (2022.05)

(58) Field of Classification Search
CPC . H04L 63/1425; H04L 63/1416; H04L 67/10; H04L 67/535; H04L 63/1408; H04W 12/122
See application file for complete search history.

(56) References Cited

U.S. PATENT DOCUMENTS

| | | |
|---|---|---|
| 2015/0356488 A1 | 12/2015 | Eden et al. |
| 2016/0232474 A1 | 8/2016 | Zou et al. |
| 2018/0041526 A1* | 2/2018 | Feng ............... G06Q 30/0631 |
| 2018/0103054 A1 | 4/2018 | Cran et al. |

(Continued)

FOREIGN PATENT DOCUMENTS

| | | |
|---|---|---|
| CN | 107707530 A | 2/2018 |
| CN | 108780475 A | 11/2018 |

(Continued)

OTHER PUBLICATIONS

Yuan et al., Sybil Defense in Crowdsourcing Platforms, 2017. (Year: 2017).*

(Continued)

*Primary Examiner* — Trong H Nguyen
(74) *Attorney, Agent, or Firm* — Lippes Mathias LLP

(57) ABSTRACT

Embodiments of the present disclosure relate to identifying collusive attackers in mobile crowdsourcing. According to embodiments of the present disclosure, the crowdsourcing behaviors of each device is abstracted as a binary variable and the similarity between any two device is measured, which result in less complex and lightweight in mathematical computation.

18 Claims, 4 Drawing Sheets

(56) References Cited

U.S. PATENT DOCUMENTS

2018/0121548 A1  5/2018  Eswaran et al.

FOREIGN PATENT DOCUMENTS

WO  2014/158411 A1  10/2014
WO  2015/007945 A1  1/2015

OTHER PUBLICATIONS

Xu et al., Revealing, Characterizing, and Detecting Crowdsourcing Spammers: A Case Study in Community Q&A, 2015. (Year: 2015).*
Jagabathula et a., Identifying Unreliable and Adversarial Workers in Crowdsourced Labeling Tasks, 2017. (Year: 2017).*
Allahbakhsh et al., Harnessing Implicit Teamwork knowledge to Improve Quality in Crowdsourcing Processes, 2014. (Year: 2014).*
Allahbakhsh et al., Detecting, Representing and Querying Collusion in Online Rating Systems, 2012. (Year: 2012).*
Kamhoua et al., Approach to Detect Non-Adversarial Overlapping Collusion in Crowdsourcing, 2017. (Year: 2017).*
Khudabukhsh et al., Detecting Non-Adversarial Collusion in Crowdsourcing, 2014. (Year: 2014).*
Extended European Search Report received for corresponding European Patent Application No. 19932438.5, dated Nov. 28, 2022, 6 pages.
Yuan et al., "Sybil Defense in Crowdsourcing Platforms", Proceedings of the 2017 ACM on Conference on Information and Knowledge Management, Nov. 6-10, 2017 pp. 1529-1538.
Guo et al., "Incentive Mechanism for Cooperative Intrusion Detection: An Evolutionary Game Approach", International Conference on Computational Science, 2018, pp. 83-97.
Wu et al., "EndorTrust: An endorsement-based reputation system for trustworthy and heterogeneous crowdsourcing", IEEE Global Communications Conference (GLOBECOM), Dec. 6-10, 2015, 6 pages.
Feng et al., "A Survey on Security, Privacy and Trust in Mobile Crowdsourcing", IEEE Internet of Things Journal, vol. 5, No. 4, Aug. 2018, pp. 2971-2992.
Chen et al., "Interactive crowdsourcing to spontaneous reporting of adverse drug reactions", IEEE International Conference on Communications (ICC), Jun. 10-14, 2014, pp. 4275-4280.
Pankratius et al., "Mobile crowd sensing in space weather monitoring: The Mahali project", IEEE Communications Magazine, vol. 52, No. 8, Aug. 2014, pp. 22-28.
Hu et al., "SmartRoad: Smartphone-based crowd sensing for traffic regulator detection and identification", ACM Transactions on Sensor Networks, vol. 11, No. 4, Dec. 2015, pp. 1-27.
Pouryazdan et al., "Anchor-assisted and vote-based trustworthiness assurance in smart city crowdsensing", IEEE Access, vol. 4, Jan. 19, 2016, pp. 529-541.
Wu et al., "Crowdsourcing multimedia QoE evaluation: A trusted framework", IEEE Transactions on Multimedia, vol. 15, No. 5, Aug. 2013, pp. 1121-1137.
Baveye et al., "LIRIS-ACCEDE: A video database for affective content analysis", IEEE Transactions on Affective Computing, vol. 6, No. 1, Jan.-Mar. 1, 2015, pp. 43-55.
Kantarci et al., "Trustworthy sensing for public safety in cloud-centric Internet of Things", IEEE Internet of Things Journal, vol. 1, No. 4, Aug. 2014, pp. 360-368.
An et al., "A crowdsourcing assignment model based on mobile crowd sensing in the Internet of Things", IEEE Internet of Things Journal, vol. 2, N. 5, Oct. 2015, pp. 358-369.
Amintoosi et al., "A trust-based recruitment framework for multi-hop social participatory sensing", IEEE International Conference on Distributed Computing in Sensor Systems, May 20-23, 2013, pp. 266-273.
Manzoor et al., "Trust evaluation for participatory sensing", Mobile and Ubiquitous Systems: Computing, Networking, and Services, 2013, pp. 176-187.
Khudabukhsh et al., "Detecting Non-Adversarial Collusion in Crowdsourcing", Second AAAI Conference on Human Computation and Crowdsourcing, 2014, pp. 104-111.
Samian et al., "Trust-based Scheme for Cheating and Collusion Detection in Wireless Multihop Networks", Proceedings of the 14th EAI International Conference on Mobile and Ubiquitous Systems: Computing, Networking and Services, Nov. 2017, pp. 1-10.
Meng et al., "Truth Discovery on Crowd Sensing of Correlated Entities", Proceedings of the 13th ACM Conference on Embedded Networked Sensor Systems, Nov. 2015, pp. 169-182.
International Search Report and Written Opinion received for corresponding Patent Cooperation Treaty Application No. PCT/CN2019/090960, dated Dec. 30, 2019, 9 pages.

* cited by examiner

MECHANISM FOR IDENTIFYING COLLUSIVE ATTACKERS

RELATED APPLICATION

This application was originally filed as PCT Application No. PCT/CN2019/090960, filed on Jun. 12, 2019, of which is incorporated herein by reference in its entirety.

FIELD

Embodiments of the present disclosure generally relate to the field of communications and in particular, to a method, device, apparatus and computer readable storage medium for identifying collusive attackers in mobile crowdsourcing.

BACKGROUND

Crowdsourcing is a new problem-solving model that solicits solutions for various tasks from the crowd, particularly online labour markets. With the popularity of sensor-rich mobile devices (e.g., smart phones and wearable devices), mobile crowdsourcing (MCS) has emerged as an effective method for mobile devices to participate in crowd computing and crowd sensing tasks, which allows outsourcing a complex task that is usually difficult to be completed by a single computer or a group of people to an unspecified group of mobile devices.

SUMMARY

Generally, embodiments of the present disclosure relate to a method for identifying collusive attackers in mobile crowdsourcing.

In a first aspect, there is provided an apparatus. The apparatus comprises at least one processor; and at least one memory including computer program codes; the at least one memory and the computer program codes are configured to, with the at least one processor, cause the apparatus to: for a first device from a plurality of devices in a crowdsourcing network, determine a first set of crowdsourcing behaviors of the first device based on history data transmitted from the first device to an apparatus, the history data associated with a set of crowdsourcing tasks performed by the first device. The apparatus is further caused to determine a first set of similarities between the first set of crowdsourcing behaviors and sets of crowdsourcing behaviors of other devices from the plurality of devices. The apparatus is also caused to determine, based on the set of similarities, whether the first device belongs to a set of collusive attackers in the crowdsourcing network. The apparatus is yet caused to in response to a determination that the first device belongs to the set of collusive attackers, exclude the first device from the crowdsourcing network.

In a second aspect, there is provided a method. The method comprises for a first device from a plurality of devices in a crowdsourcing network, determining a first set of crowdsourcing behaviors of the first device based on history data transmitted from the first device to an apparatus, the history data associated with a set of crowdsourcing tasks performed by the first device. The method also comprises determining a first set of similarities between the first set of crowdsourcing behaviors and sets of crowdsourcing behaviors of other devices from the plurality of devices. The method further comprises determining, based on the set of similarities, whether the first device belongs to a set of collusive attackers in the crowdsourcing network. The method yet comprises in response to a determination that the first device belongs to the set of collusive attackers, excluding the first device from the crowdsourcing network.

In a third aspect, there is provided an apparatus comprising: for a first device from a plurality of devices in a crowdsourcing network, means for determining a first set of crowdsourcing behaviors of the first device based on history data transmitted from the first device to an apparatus, the history data associated with a set of crowdsourcing tasks performed by the first device; means for determining a first set of similarities between the first set of crowdsourcing behaviors and sets of crowdsourcing behaviors of other devices from the plurality of devices; means for determining, based on the set of similarities, whether the first device belongs to a set of collusive attackers in the crowdsourcing network; and means for in response to a determination that the first device belongs to the set of collusive attackers, excluding the first device from the crowdsourcing network.

In a fourth aspect, there is provided a non-transitory computer readable medium comprising program instructions for causing an apparatus to perform at least the method according to the second aspect.

It is to be understood that the summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Some example embodiments will now be described with reference to the accompanying drawings, where.

Throughout the drawings, the same or similar reference numerals represent the same or similar element.

DETAILED DESCRIPTION

Figure 1:
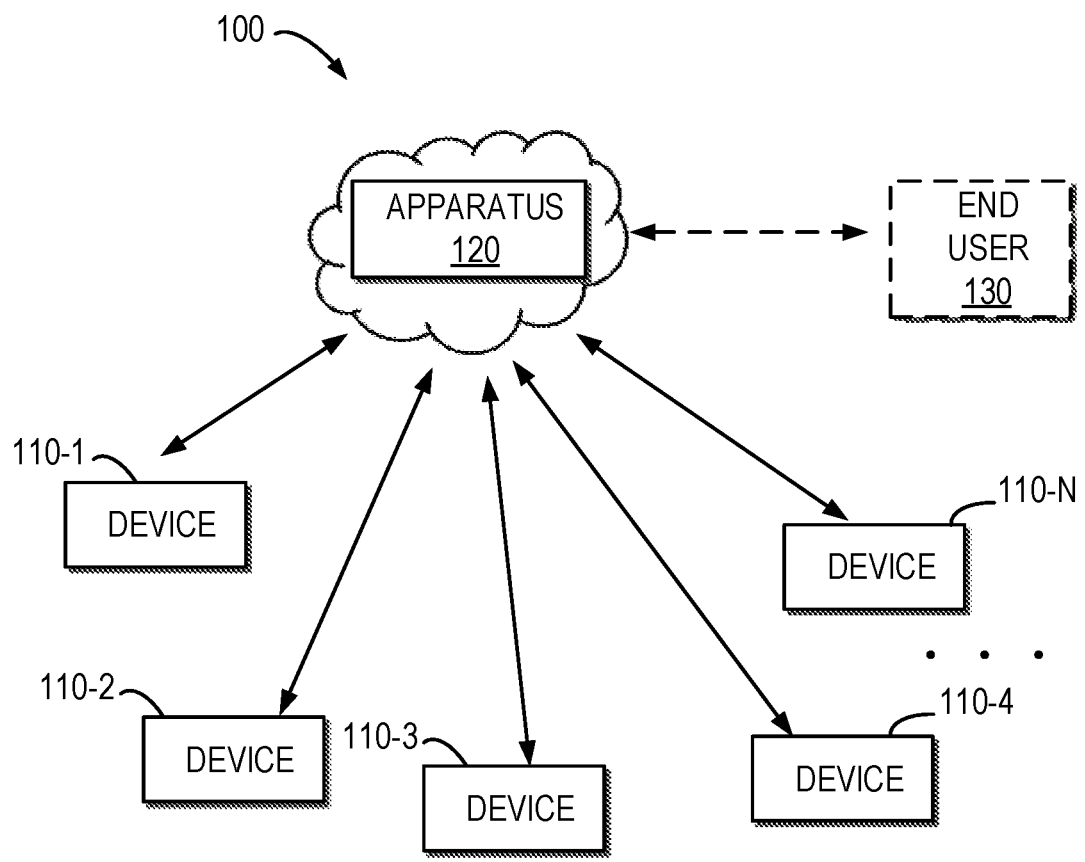
FIG. 1 illustrates a schematic diagram of a communication system according to embodiments of the present disclosure.

Principle of the present disclosure will now be described with reference to some example embodiments. It is to be understood that these embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/ or combinations thereof.

As used in this application, the term "circuitry" may refer to one or more or all of the following:

(a) hardware-only circuit implementations (such as implementations in only analog and/or digital circuitry) and (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As used herein, the term "communication network" refers to a network following any suitable communication standards, such as Long Term Evolution (LTE), LTE-Advanced (LTE-A), Wideband Code Division Multiple Access (WCDMA), High-Speed Packet Access (HSPA), Narrow Band Internet of Things (NB-IoT) and so on. Furthermore, the communications between a user equipment and a network device in the communication network may be performed according to any suitable generation communication protocols, including, but not limited to, the first generation (1G), the second generation (2G), 2.5G, 2.75G, the third generation (3G), the fourth generation (4G), 4.5G, the future fifth generation (5G) communication protocols, and/or any other protocols either currently known or to be developed in the future. Embodiments of the present disclosure may be applied in various communication systems. Given the rapid development in communications, there will of course also be future type communication technologies and systems with which the present disclosure may be embodied. It should not be seen as limiting the scope of the present disclosure to only the aforementioned system.

As used herein, the term "network device" refers to a node in a communication network via which a user equipment accesses the network and receives services therefrom. The network device may refer to a base station (BS) or an access point (AP), for example, a node B (NodeB or NB), an evolved NodeB (eNodeB or eNB), a new radio (NR) NB (also referred to as a gNB), a Remote Radio Unit (RRU), a radio header (RH), a remote radio head (RRH), a relay, a low power node such as a femto, a pico, and so forth, depending on the applied terminology and technology.

The term "terminal device" refers to any end device that may be capable of wireless communication. By way of example rather than limitation, a terminal device may also be referred to as a communication device, user equipment (UE), a Subscriber Station (SS), a Portable Subscriber Station, a Mobile Station (MS), or an Access Terminal (AT). The terminal device may include, but not limited to, a mobile phone, a cellular phone, a smart phone, voice over IP (VoIP) phones, wireless local loop phones, a tablet, a wearable terminal device, a personal digital assistant (PDA), portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME), USB dongles, smart devices, wireless customer-premises equipment (CPE), an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. In the following description, the terms "terminal device", "communication device", "terminal", "user equipment" and "UE" may be used interchangeably.

Nowadays, mobile devices are powerful in terms of computing capability and data transmission. So, it is possible for mobile crowd computing to outsource a computing task to mobile devices and collect their computing results via various networks. Mobile crowd sensing (also called participatory sensing) utilizes mobile devices as sensors to collect information about environments, infrastructures, and mobile users. It is widely applied in personal data collection (for example, personal health data), and in environment monitoring (for example, noise, weather, and pollution).

FIG. 1 illustrates a schematic diagram of a communication system 100 in which embodiments of the present disclosure can be implemented. As shown in FIG. 1, the communication system 100, which is a part of a communication network, comprises devices 110-1, 110-2, . . . , 110-N (collectively referred to as "device(s) 110" where N is an integer number). The devices may be used by a worker to participate in crowdsourcing and perform the assigned tasks.

The communication system 100 comprises one or more apparatus, for example, an apparatus 120. The term "apparatus" used herein may be operated and/or owned by a vendor to provide solutions and/or services to end users and organizations. It should be understood that the communication system 100 may also comprise other elements, for example, the end user 130. The end user 130 may refer to an individual or organization that lacks an ability to perform a certain computing or data collection task. The communication system 100 may also comprise other elements which are omitted for clarity purpose. It is to be understood that the numbers of devices shown in FIG. 1 are given for the purpose of illustration without suggesting any limitations. The devices 110 and the apparatus 120 may communicate with each other.

Communications in the communication system 100 may be implemented according to any proper communication protocol(s), comprising, but not limited to, cellular communication protocols of the first generation (1G), the second generation (2G), the third generation (3G), the fourth generation (4G) and the fifth generation (5G) and on the like, wireless local network communication protocols such as Institute for Electrical and Electronics Engineers (IEEE) 802.11 and the like, and/or any other protocols currently known or to be developed in the future. Moreover, the communication may utilize any proper wireless communication technology, comprising but not limited to: Code Division Multiple Access (CDMA), Frequency Division Multiple Access (FDMA), Time Division Multiple Access (TDMA), Frequency Division Duplex (FDD), Time Division Duplex (TDD), Multiple-Input Multiple-Output (MIMO), Orthogonal Frequency Division Multiple (OFDM), Discrete Fourier Transform spread OFDM (DFT-s-OFDM) and/or any other technologies currently known or to be developed in the future. As shown in FIG. 1, there are three main parties in an MCS platform, namely MCS service provider (SP), end user (EU), and MCS worker.

As discussed above, the MCS has several advantages over traditional wireless sensor networks (WSNs). First, the MCS may save the extra cost of installation and maintenance of new hardware infrastructure by employing the widely distributed devices for data collection and processing. Therefore, its deployment and operation cost is lower than WSN. Second, the sensing devices in the MCS are mobile and can provide a wider coverage than WSN. Third, the MCS can perform instant data collection in a more flexible and cheaper way than WSNs. For example, in the application of urban traffic monitoring, it could be costly to deploy sensors that can cover a whole transportation network. This problem can be easily solved by the MCS, due to the ubiquity of mobile devices. Fourth, the MCS can be easily applied to sense big and temporary data. Massive data could be generated via the MCS depending on the scalability. For those tasks that need to collect data from a certain area just once, deploying sensors is costly and unnecessary in WSNs. In contrast, the MCS can conduct data collection in a convenient and self-organized manner in such scenarios. Finally, the MCS provides a way to involve and utilize both human and machine intelligence.

In recent years, the MCS has attracted extensive attention and been exploited to develop numerous kinds of applications, such as environment monitoring, infrastructure monitoring, quality-of-experience analysis, public safety, and so on.

Due to the nature of openness and mobility, the MCS offers almost all mobile users an opportunity to participate in MCS activities. As a result, the devices in MCS may be unreliable and vary in terms of ability, honesty, dependability, loyalty and so on. Accordingly, trust management may be an important part of the MCS platform in which the trust value of devices is evaluated and used to reliable worker-selection. In the MCS, the trusted devices should not only perform honest behaviors, but also fulfill the requirements of a certain task with high quality. The malicious devices with low trust value may be rejected to in the task assignment.

However, when trust management is employed in MCS, it confronts some technical problems. For example, malicious devices can collude with each other to form a collusive clique which can increase their attack power and fake the crowd data intentionally to destroy some tasks. If there are the adequate malicious devices, a collusive clique can mislead the apparatus to deliver a wrong final decision to EUs. To succeed in collusive attack, some malicious devices may perform honest behaviors all by themselves to prompt their trust values. Thus, an effective defense scheme must be designed to suppress malicious devices for collusive attack.

In conventional technologies, some trust management schemes have been proposed for the MCS. To evaluate the trust value of workers, a number of properties that affect the credible crowd data may be considered, such as link reliability, service quality, and region heat. Further, a ranking-based is proposed scheme that introduces trust and worker ability into the evaluation of worker trust values. Alternatively, an endorsement-based reputation system is proposed to evaluate the trust of workers, which takes endorsement of other workers into account. Moreover, in some conventional technologies, the trust value of a device may be computed using predications and user feedback. They estimate whether a device is trustworthy or not by his past behaviors concerning all tasks as a whole, and give low weights to the crowd data for less trustworthy workers when generating the final decision.

The conventional technologies can make some attacks of the malicious devices more difficult to succeed. However, the conventional technologies do not consider the situation where the malicious devices have high trust values.

According to embodiments of the present disclosure, the crowdsourcing behaviors of each device is abstracted as a binary variable and the similarity between any two device is measured, which result in less complex and lightweight in mathematical computation.

Figure 2:
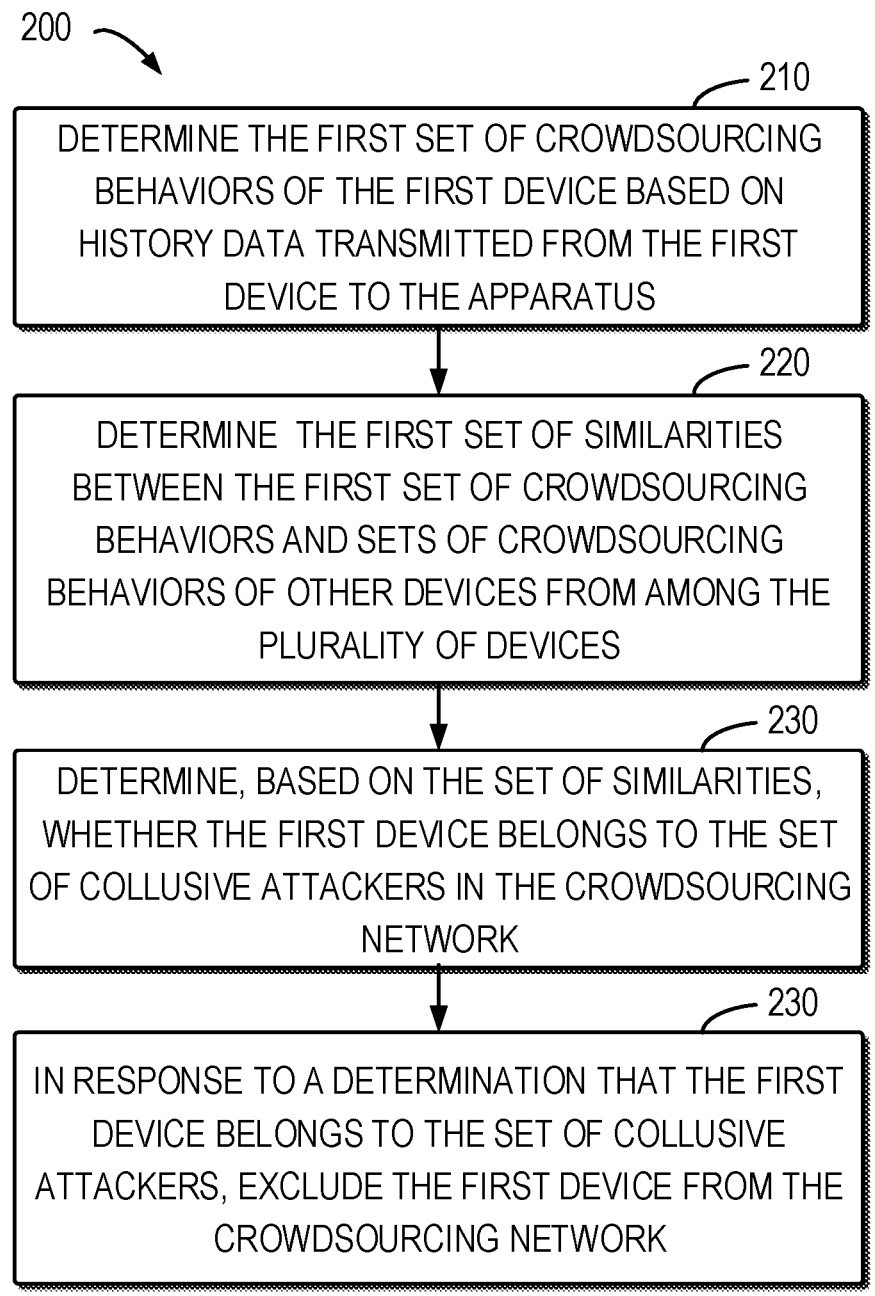
FIG. 2 illustrates a flow chart of a method implemented at a terminal device according to embodiments of the present disclosure.

FIG. 2 illustrates a flow chart of a method 200 in accordance with embodiments of the present disclosure. The method 400 may be implemented at any suitable devices. Only for the purpose of illustrations, the method 200 is described to be implemented at the apparatus 120.

At block 210, the apparatus 120 determines a set of crowdsourcing behaviors of the first device 110-1 based on historical data received from the first device 110-1. The historical data is associated with at least one crowdsourcing task performed by the first device 110-1. In some embodiments, for a crowdsourcing task, after receiving a service request from the end user 130, the apparatus 120 may assign relevant tasks to the devices 110. After receiving expected crowd data (for example, computing results in crowd computing or sensing data crowd sensing) from the devices 110, the apparatus 120 may aggregate the received data and transmit a final decision to the end user 130.

In some embodiments, the apparatus 120 may determine the set of crowding sourcing behaviors by comparing the received historical data with the final decision. For example, for a crowdsourcing task, if the historical data is incorrect, which means the historical data does not match with the final decision, the apparatus 120 may determine the crowdsourcing behavior to be a first value, for example, "1." If the historical data is correct, which means the historical data matches with the final decision, the apparatus 120 may determine the crowdsourcing behavior to be a second value, for example, "0." It should be noted that the first and second values may be any suitable values. Table 1 below illustrates examples of crowdsourcing behaviors of the devices 110.

TABLE 1

| Crowdsourcing Task | The device 110-1 | The device 110-2 | ... | The device 110-N |
|---|---|---|---|---|
| 1 | $W_1(b_1)_1$ | $W_2(b_2)_1$ | ... | $W_n(b_n)_1$ |
| 2 | $W_1(b_1)_2$ | $W_2(b_2)_2$ | ... | $W_n(b_n)_2$ |
| ... | ... | ... | ... | ... |
| k | $W_1(b_1)_k$ | $W_2(b_2)_k$ | ... | $W_n(b_n)_k$ |

The parameter "k" represents the number of crowdsourcing tasks and the parameter "n" is the total number of the devices in the crowdsourcing network 100. It should be noted that the parameters k and n can be any suitable numbers. The parameter $W_n(b_n)_k$ represents the crowdsourcing behavior of the device 110-$n$ with respect to the $k^{th}$ crowdsourcing task.

As shown in Table 1, if the device 110-1 reports incorrect data for the $1^{st}$ crowdsourcing task, the crowdsourcing behavior $W_1(b_1)_1$ may be represented as $W_1(1)_1$. If the device 110-1 reports correct data for the $1^{st}$ crowdsourcing task, the crowdsourcing behavior $W_1(b_1)_1$ may be represented as $W_1(0)_1$. If the device 110-1 does not report anything, the crowdsourcing behavior $W_1(b_1)_1$ may be represented as $W_1(-)_1$. In some embodiments, the first set of crowdsourcing behavior of the first device 110-1 may be represented as $B_1=[W_1(b_1)_1, W_1(b_1)_2, \ldots, W_1(b_1)_k]$. The redundant data such as $W_i(-)_2$ or $W_j(-)_6$ are useless to measure the similarity. Since "1" is useful to analyze the collusive features of malicious workers, it can be set $W_i(-)_2$ to be $W_i(0)_2$ and set $W_j(-)_6$ to be $W_j(0)_6$. As a consequence, both the correct data and nothing reported by the device can be abstracted as "0." In this way, the mathematical computation may be less complex and lightweight.

At block 220, the apparatus 120 determines a first set of similarities between the first set of crowdsourcing behaviors and set of crowdsourcing behaviors of the other devices (for example, the devices 110-2, 110-3, 110-4, . . . 110-N) from the plurality devices b 110. In some embodiments, the collusive attackers may report incorrect data together to destroy some tasks. That is, the collusive attackers often launch "1" behaviors together in a certain task time and behave high similarity among themselves. Thus, the logic AND operation (&) may be used to measure the similarity.

In some embodiments, for the $i^{th}$ device and the $j^{th}$ device, the logic AND operation between $B_i$ and $B_j$ can be represented as:

$$B_{ij}=B_i \& B_j \qquad (1)$$

where $B_i$ represents the set of crowdsourcing behaviors of the $i^{th}$ device in the plurality of devices 110 and $B_j$ represents the set of crowdsourcing behaviors of the $j^{th}$ device in the plurality of devices 110. It should be noted that i and j may be any suitable integer numbers and the maximum value may be the total number of the devices 110. Only for the purpose of illustrations, the $i^{th}$ device used hereinafter refers to the first device 110-1 and the $j^{th}$ device used hereinafter refers to the second device 110-2.

In some embodiments, the apparatus 120 may determine the first set of similarities based on the number of the total number crowdsourcing tasks and the number of crowdsourcing tasks of which the data of the devise are incorrect. Since the collusive attackers may report incorrect data together to destroy some crowdsourcing tasks, the similarity among the collusive attackers may be large. Alternatively, the apparatus 120 may determine the first set of similarities based on a parameter which is associated with continuous incorrect historical data.

In some embodiments, the apparatus 120 may determine a total number of crowdsourcing tasks performed by the first device 110-1 and the second device 110-2. The apparatus 120 may determine a first number of crowdsourcing tasks. The first device 110-1 and the second device 110-2 may report incorrect data to the apparatus 120 regarding the crowdsourcing tasks. The apparatus 120 may also determine a second number of crowdsourcing tasks. The first device 110-1 and the second device 110-2 may report continuous incorrect data to the apparatus 120 regarding the crowdsourcing tasks. The similarities between the first set of crowdsourcing behaviors of the first device 110-1 and the set of crowdsourcing behaviors of other devices in the plurality of devices 110 may be obtained in a similar way. Only as example, the similarity between the $i^{th}$ device and the $j^{th}$ device may be measured as below:

$$sim_{ij} = \frac{|1_{ij}| + c_{ij}}{|B_{ij}| + c_{ij}}, |1_{ij}| \leq |B_{ij}| \qquad (2)$$

where the parameter $|1_{ij}|$ denotes the number of "1" in $B_{ij}$, the parameter $|B_{ij}|$ is corresponding to the amount of elements in $B_{ij}$, the parameter $c_{ij}$ is the number the continuous false crowdsourcing behaviors of devices. Only for the purpose of illustrations, the $i^{th}$ device used hereinafter refers to the first device 110-1 and the $j^{th}$ device used hereinafter refers to the second device 110-2.

In some embodiments, if the first device 110-1 and the second device 110-2 report incorrect crowdsourcing data simultaneously at the $p^{th}$ task time, they may continue to report false crowd data at the $(p+1)^{th}, \ldots, (p+c_{ij})^{th}$ task time. Such continuous incorrect behaviors can increase the similarity between the first device 110-1 and the second device 110-2. The parameter $c_{ij}$ may make the first device 110-1 and the second device 110-2 behave a higher similarity due to their continuous incorrect crowdsourcing behaviors. In this way, the collusive attackers and the host devices are differentiated more clearly. Table 2 below illustrates pseudo codes for determining the parameter $c_{ij}$.

TABLE 2

Input: $B_{ij}$
Output: $c_{ij}$
1: Initialize $c_{ij}=0$, p=1
2: for each $b_{ij}^p \in B_{ij}$ (1≤p≤$|B_{ij}|$) do
3:   if ($b_{ij}^p == 1$ && $b_{ij}^{p+1} == 1$) then
4:     $c_{ij}$++
5:     p++
6:   end if
7: end for In some embodiments, the first set of similarities may be represented as:

$$SIM_i=[sim_{i1}, \ldots, sim_{ij}, \ldots, sim_{in}] \qquad (3)$$

where $sim_{i1}$ represents the similarity between the $i^{th}$ device and the first device and the parameter n represents the number of devices. For all devices in the crowdsourcing network 100, their similarity vectors can be represented as a matrix $SIM_{n\times n}$:

$$SIM_{n\times n} = \begin{bmatrix} sim_{11} & \cdots & sim_{1n} \\ \vdots & \ddots & \vdots \\ sim_{n1} & \cdots & sim_{nn} \end{bmatrix} \quad (4)$$

At block 230, the apparatus 120 determines whether the first device 110-1 belongs to a set of collusive attackers in the crowdsourcing network 110 based on the first set of similarities. For example, if the first device 110-1 behaves similarly to a known collusive attacker, the apparatus 120 may determine the first device 110-1 belongs to the set of collusive attackers. For example, the distance between the first device 110-1 and the $m^{th}$ device may be represented as:

$$d_{im} = \frac{1}{n}\sum_{q=1}^{n}(sim_{iq} - sim_{mq})^2 \quad (5)$$

where $d_{im}$ represents the distance between the first device 110-1 and the $m^{th}$ device, the n represents the number of the plurality of devices, $sim_{iq}$ represents the similarity between the first device and the $q^{th}$ device in the first set of similarities, and $sim_{mq}$ represents the similarity between the $m^{th}$ device and the $q^{th}$ device in the second set of similarities. Only for the purpose of illustrations, the $q^{th}$ device used hereinafter refers to the third device 110-3.

In some embodiments, the apparatus 120 may determine the first distance between the first device 110-1 and the third device 110-3 based on the first set of similarities and the third set of similarities. The third set of similarities may be between the third set of crowdsourcing behaviors of the third device 110-3 and the sets of crowdsourcing behaviors of other devices 110. The set of collusive attackers comprises the third device. If the first distance is below a threshold distance, the apparatus 120 may determine the first device 110-1 to be one of the collusive attackers.

In some embodiments, a binary-minmaxs clustering method may be designed to differentiate collusive attackers and honest devices. In this example, two samples may be selected as the initial minmax vectors by analyzing the variance of each set of similarities. In this way, reliable device-selection may be ensured. For example, the apparatus 120 may determine the first distance between the first device 110-1 and the third device 110-3 based on the first set of similarities and the third set of similarities. The third set of similarities may be between the third set of crowdsourcing behaviors of the third device 110-3 and the sets of crowdsourcing behaviors of other devices 110. The set of collusive attackers comprises the third device.

The apparatus 120 may determine the second distance between the first device 110-1 and the fourth device 110-4 based on the first set of similarities and the fourth set of similarities. The fourth set of similarities may be between the fourth set of crowdsourcing behaviors of the fourth device 110-4 and the sets of crowdsourcing behaviors of other devices 110. The set of collusive attackers may not comprise the fourth device 110-4. If the first distance exceeds the second distance, the apparatus 120 may determine that the first device 110-1 belongs to the set of collusive attackers.

In some embodiments, both collusive attackers and honest devices have high trust values, the variance analysis should be performed in $SIM_{h\times h}$ from the devices with high trust values ($\Omega$) at the current MCS action, in which h is the amount of elements in a $\Omega$.

Since collusive attackers often launch "1" behaviors together, each of them may have a low variance in $SIM_i$. Let $var(SIM_i)$ denotes the variance of $SIM_i$, the initial min vector of collusive attackers can be selected as:

$$\mu_1 = \min_{W_i \in \Omega}(var(SIM_i)) \quad (6)$$

Since honest devices often report honest crowdsourcing data individually, each of them may get a high variance in $SIM_i$. The initial max vector of honest workers can be selected as:

$$\mu_2 = \max_{W_i \in \Omega}(var(SIM_i)) \quad (7)$$

Table 3 below illustrates pseudo codes for determining the collusive devices.

TABLE 3

Input: $\Omega$, $SIM_{h\times h}$, $\{\mu_1, \mu_2\}$
Output: the set of collusive attackers ($\Psi_1$) and honest workers ($\Psi_2$)
1: repeat
2:   Initialize $\Psi_1 = \Psi_2 = \emptyset$
3:   for i = 1, i ≤ h, i ++ do
4:     Calculate the distance $d_{ij}$ between $SIM_i$ and $\mu_s (1 \le s \le 2)$ with equation (6)
5:     if ($d_{i1} > d_{i2}$) then
6:       $\Psi_1 = \{W_i\} \cup \Psi_1$
7:     else
8:       $\Psi_2 = \{W_i\} \cup \Psi_2$
9:     end if
10:   end for
11:   Update the new min vector $\mu_1' = \min_{W_i \in \Psi_1}(var(SIM_i))$
12:   Update the new max vector $\mu_2' = \min_{W_j \in \Psi_2}(var(SIM_j))$
13:   for s = 1, s ≤ 2, s ++ do
14:     if ($\mu_s' \ne \mu_s$) then
15:       Update $\mu_s = \mu_s'$
16:     else
17:       Keep the current minmax vectors unchanged
18:     end if
19:   end for
20: until the current minmax vectors are not updated again At block 240, the apparatus 120 excludes the first device from the crowdsourcing network 100 if the first device 110-1 belongs to the set of collusive attackers. In some embodiments, the apparatus 120 may remove the first device 110-1 from the list of trusted devices. Alternatively, the apparatus 120 may stop assigning any further crowdsourcing task to the first device 110-1.

In some embodiments, if the first device 110-1 leaves the crowdsourcing network 100, the apparatus 120 may transmit an indication regarding the first device belongs to the set of collusive attackers to a further apparatus 120. In some embodiments, the apparatus 120 may identify the collusive attackers periodically. Alternatively, if a new device enters the crowdsourcing network 100, the apparatus 120 may determine whether the new device belongs to the set of collusive attackers.

In some embodiments, an apparatus for performing the method 200 (for example, the apparatus 120) may comprise respective means for performing the corresponding steps in the method 100. These means may be implemented in any suitable manners. For example, it can be implemented by circuitry or software modules.

In some embodiments, the apparatus comprises: for a first device from a plurality of devices in a crowdsourcing network, means for determining a first set of crowdsourcing behaviors of the first device based on history data transmitted from the first device to the apparatus, the history data associated with a set of crowdsourcing tasks performed by the first device; means for determining a first set of similarities between the first set of crowdsourcing behaviors and sets of crowdsourcing behaviors of other devices from the plurality of devices; means for determining, based on the set of similarities, whether the first device belongs to a set of collusive attackers in the crowdsourcing network; and means for in response to a determination that the first device belongs to the set of collusive attackers, excluding the first device from the crowdsourcing network.

In some embodiments, the means for determining the first set of crowdsourcing behaviors comprises: means for in response to the history data associated with a crowdsourcing task being false, determining a corresponding crowdsourcing behavior in the first set of crowdsourcing behaviors to be a first value; and means for in response to the history data associated with a further crowdsourcing task, determining a further corresponding crowdsourcing behavior in the first set of crowdsourcing behaviors to be a second value different from the first value.

In some embodiments, the means for determining the similarities comprises means for determining the similarity between the first device and a second device from the plurality of devices by: determining a total number of crowdsourcing tasks performed by the first and second devices; determining a first number of crowdsourcing tasks, the first number of crowdsourcing tasks associated with incorrect history data of both the first and second devices; determining a second number of crowdsourcing tasks, the second number of crowdsourcing tasks being associated with continuously incorrect history data of both the first and second devices data; and determining the similarity based on the total, first and second number.

In some embodiments, the means for determining the similarities comprises determining the similarity between the first device and a second device from the plurality of devices by:

$$sim_{ij} = \frac{|1_{ij}| + c_{ij}}{|B_{ij}| + c_{ij}}, |1_{ij}| \leq |B_{ij}|,$$

wherein the $sim_{ij}$ represents the similarity between the first device and the second device, the $B_{ij}$ represents the total total number of crowdsourcing tasks performed by the first and second devices, the $|1_{ij}|$ represents the first number of crowdsourcing tasks, the $c_{ij}$ represents the second number of crowdsourcing tasks, the i represents the first device and the j represents the second device.

In some embodiments, the means for determining whether the first device belongs to the set of collusive attackers comprises: means for determining a first distance between the first device and a third device from the plurality of devices based on the first set of similarities and a third set of similarities, the third set of similarities being between a third set of crowdsourcing behaviors of the third device and the sets of crowdsourcing behaviors of other devices from the plurality of devices, the set of collusive attackers comprising the third device; means for determining a second distance between the first device and a fourth device from the plurality of devices based on the first set of similarities and a fourth set of similarities, the fourth set of similarities being between a fourth set of crowdsourcing behaviors of the fourth device and the sets of crowdsourcing behaviors of other devices from the plurality of devices, the set of collusive attackers excluding the fourth device; and means for in response to the first distance exceeding the second distance, determining that the first device belongs to the set of collusive attackers.

In some embodiments, the means for determining whether the first device belongs to the set of collusive attackers comprises: means for determining a first distance between the first device and a third device based on the first set of similarities and a third set of similarities by:

$$d_{im} = \frac{1}{n}\sum_{q=1}^{n}(sim_{iq} - sim_{mq})^2,$$

wherein $d_{im}$ represents the first distance, the n represents the number of the plurality of devices, $sim_{iq}$ represents the similarity between the first device and the $q^{th}$ device in the first set of similarities, and $sim_{mq}$ represents the similarity between the third device and the $q^{th}$ device in the second set of similarities.

In some embodiments, the means for determining whether the first device belongs to the set of collusive attackers comprises: means for determining a first distance between the first device and a third device based on the first set of similarities and a third set of similarities, the third set of similarities being between a third set of crowdsourcing behaviors of the third device and the sets of crowdsourcing behaviors of other devices from the plurality of devices, the set of collusive attackers comprising the third device; and means for in response to the first distance being below a threshold distance, determining that the first device belongs to the set of collusive attackers.

In some embodiments, the means for excluding the first device in the crowdsourcing environment comprises: means for stopping assigning a further crowdsourcing task to the first device.

In some embodiments, the apparatus comprises means for transmitting, to a further apparatus, an indication regarding the first device belongs to the set of collusive attackers.

Figure 3:
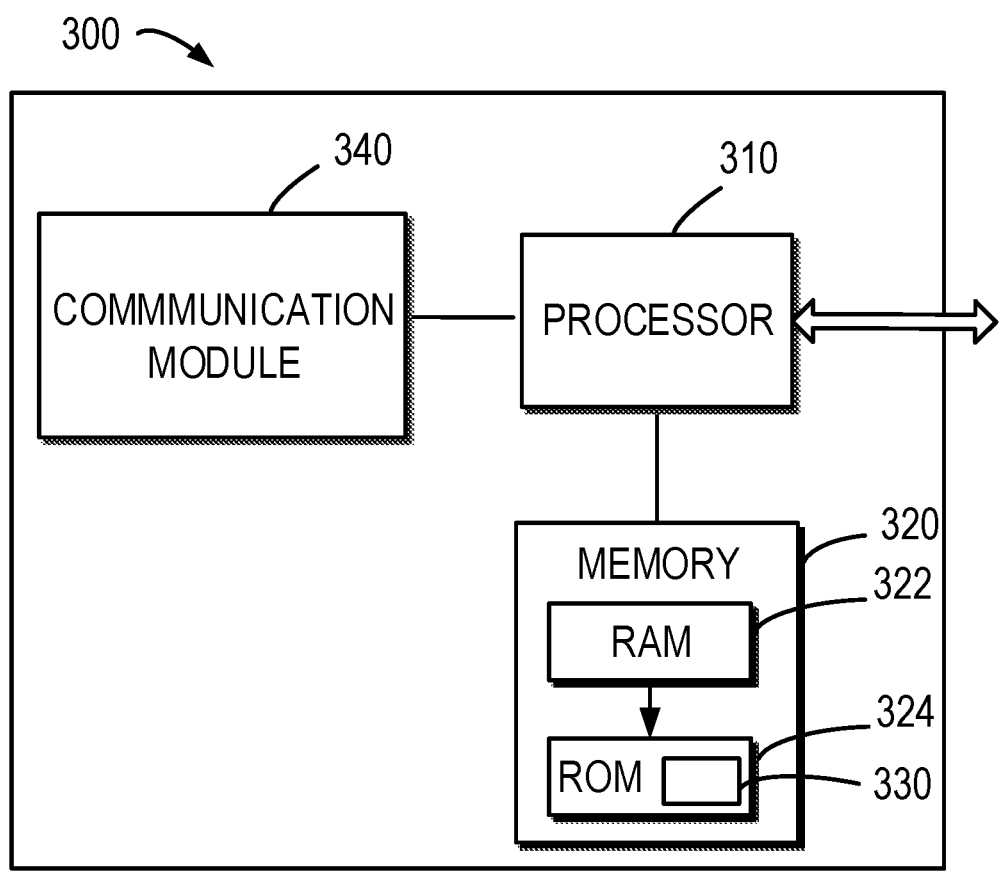
FIG. 3 illustrates a schematic diagram of a device according to embodiments of the present disclosure.

FIG. 3 is a simplified block diagram of a device 300 that is suitable for implementing embodiments of the present disclosure. The device 300 may be provided to implement the communication device, for example the apparatus 120 or the devices 110 as shown in FIG. 1. As shown, the device 300 includes one or more processors 310, one or more memories 320 coupled to the processor 310, and one or more communication module (for example, transmitters and/or receivers (TX/RX)) 340 coupled to the processor 310.

The communication module 340 is for bidirectional communications. The communication module 340 has at least one antenna to facilitate communication. The communication interface may represent any interface that is necessary for communication with other network elements.

The processor 310 may be of any type suitable to the local technical network and may include one or more of the following: general purpose computers, special purpose computers, microprocessors, digital signal processors (DSPs) and processors based on multicore processor architecture, as non-limiting examples. The device 300 may have multiple processors, such as an application specific integrated circuit chip that is slaved in time to a clock which synchronizes the main processor.

The memory 320 may include one or more non-volatile memories and one or more volatile memories. Examples of the non-volatile memories include, but are not limited to, a Read Only Memory (ROM) 324, an electrically programmable read only memory (EPROM), a flash memory, a hard disk, a compact disc (CD), a digital video disk (DVD), and other magnetic storage and/or optical storage. Examples of the volatile memories include, but are not limited to, a random access memory (RAM) 322 and other volatile memories that will not last in the power-down duration.

A computer program 330 includes computer executable instructions that are executed by the associated processor 310. The program 330 may be stored in the ROM 324. The processor 310 may perform any suitable actions and processing by loading the program 330 into the RAM 322.

The embodiments of the present disclosure may be implemented by means of the program 330 so that the device 300 may perform any process of the disclosure as discussed with reference to FIG. 2. The embodiments of the present disclosure may also be implemented by hardware or by a combination of software and hardware.

Figure 4:
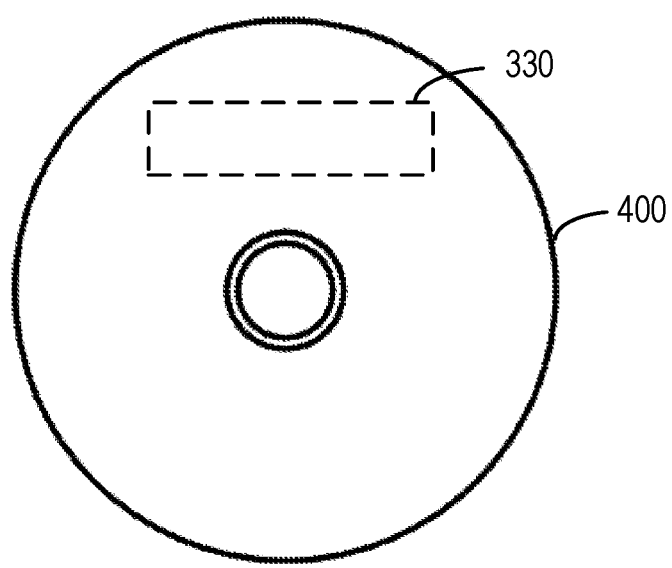
FIG. 4 shows a block diagram of an example computer readable medium in accordance with some embodiments of the present disclosure.

In some embodiments, the program 330 may be tangibly contained in a computer readable medium which may be included in the device 300 (such as in the memory 320) or other storage devices that are accessible by the device 300. The device 300 may load the program 330 from the computer readable medium to the RAM 322 for execution. The computer readable medium may include any types of tangible non-volatile storage, such as ROM, EPROM, a flash memory, a hard disk, CD, DVD, and the like. FIG. 4 shows an example of the computer readable medium 400 in form of CD or DVD. The computer readable medium has the program 330 stored thereon.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representations, it is to be understood that the block, apparatus, system, technique or method described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the methods 400 and 600 as described above with reference to FIGS. 2-5. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on an apparatus, partly on the apparatus, as a stand-alone software package, partly on the apparatus and partly on a remote apparatus or entirely on the remote apparatus or server.

In the context of the present disclosure, the computer program codes or related data may be carried by any suitable carrier to enable the device, apparatus or processor to perform various processes and operations as described above. Examples of the carrier include a signal, computer readable medium, and the like.

The computer readable medium may be a computer readable signal medium or a computer readable storage medium. A computer readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. An apparatus comprising:
   at least one processor; and
   at least one memory including computer program codes;

the at least one memory and the computer program codes are configured to, with the at least one processor, cause the apparatus to:

for a first device from a plurality of devices in a crowdsourcing network, determine a first set of crowdsourcing behaviors of the first device based on a comparison of history data transmitted from the first device to the apparatus, the history data associated with a set of crowdsourcing tasks performed by the first device, with a corresponding final decision transmitted to an end user by the apparatus, the final decision based on aggregated crowd data of the set of crowdsourcing tasks received by the apparatus;

determine a first set of similarities between the first set of crowdsourcing behaviors and sets of crowdsourcing behaviors of other devices from the plurality of devices;

determine, based on the first set of similarities, whether the first device belongs to a set of collusive attackers in the crowdsourcing network;

in response to a determination that the first device belongs to the set of collusive attackers, exclude the first device from the crowdsourcing network; and communicate, to a further apparatus, an indication regarding the first device belonging to the set of collusive attackers.

2. The apparatus of claim 1, wherein the apparatus is caused to determine the first set of crowdsourcing behaviors by:

in response to the history data associated with a crowdsourcing task being false, determining a corresponding crowdsourcing behavior in the first set of crowdsourcing behaviors to be a first value; and in response to the history data associated with a further crowdsourcing task being true, determining a further corresponding crowdsourcing behavior in the first set of crowdsourcing behaviors to be a second value different from the first value.

3. The apparatus of claim 1, wherein the apparatus is caused to determine the first set of similarities by:

determining a similarity between the first device and a second device from the plurality of devices by:

determining a total number of crowdsourcing tasks performed by the first and second devices;

determining a first number of crowdsourcing tasks, the first number of crowdsourcing tasks associated with incorrect history data of both the first and second devices;

determining a second number of crowdsourcing tasks, the second number of crowdsourcing tasks being associated with continuously incorrect history data of both the first and second devices; and determining the similarity based on the total number, the first number, and the second number.

4. The apparatus of claim 3, wherein the apparatus is caused to determine the first set of similarities by:

determining the similarity between the first device and the second device from the plurality of devices by:

$$sim_{ij} = \frac{|1_{ij}| + c_{ij}}{|B_{ij}| + c_{ij}}, |1_{ij}| \le |B_{ij}|,$$

wherein $sim_{ij}$ represents the similarity between the first device and the second device, $B_{ij}$ represents the total number of crowdsourcing tasks performed by the first and second devices, $|1_{ij}|$ represents the first number of crowdsourcing tasks, $c_{ij}$ represents the second number of crowdsourcing tasks, the i represents the first device and the j represents the second device.

5. The apparatus of claim 1, wherein the apparatus is caused to determine whether the first device belongs to the set of collusive attackers by:

determining a first distance between the first device and a third device from the plurality of devices based on the first set of similarities and a third set of similarities, the third set of similarities being between a third set of crowdsourcing behaviors of the third device and the sets of crowdsourcing behaviors of other devices from the plurality of devices, the set of collusive attackers comprising the third device;

determining a second distance between the first device and a fourth device from the plurality of devices based on the first set of similarities and a fourth set of similarities, the fourth set of similarities being between a fourth set of crowdsourcing behaviors of the fourth device and the sets of crowdsourcing behaviors of other devices from the plurality of devices, the set of collusive attackers excluding the fourth device; and in response to the first distance exceeding the second distance, determining that the first device belongs to the set of collusive attackers.

6. The apparatus of claim 5, wherein the apparatus is caused to determine whether the first device belongs to the set of collusive attackers by:

determining the first distance between the first device and the third device based on the first set of similarities and the third set of similarities by:

$$d_{im} = \frac{1}{n}\sum_{q=1}^{n}(sim_{iq} - sim_{mq})^2,$$

wherein $d_{im}$ represents the first distance, the n represents a number of the plurality of devices, $sim_{iq}$ represents a similarity between the first device and the $q^{th}$ device in the first set of similarities, and $sim_{mq}$ represents a similarity between the third device and the $q^{th}$ device in a second set of similarities.

7. The apparatus of claim 1, wherein the apparatus is caused to determine whether the first device belongs to the set of collusive attackers by:

determining a first distance between the first device and a third device based on the first set of similarities and a third set of similarities, the third set of similarities being between a third set of crowdsourcing behaviors of the third device and the sets of crowdsourcing behaviors of other devices from the plurality of devices, the set of collusive attackers comprising the third device; and in response to the first distance being below a threshold distance, determining that the first device belongs to the set of collusive attackers.

8. The apparatus of claim 1, wherein the apparatus is caused to exclude the first device in the crowdsourcing network by:

stopping assigning a further crowdsourcing task to the first device.

9. A method comprising:

for a first device from a plurality of devices in a crowdsourcing network, determining a first set of crowdsourcing behaviors of the first device by comparing history data transmitted from the first device to an apparatus, the history data associated with a set of crowdsourcing tasks performed by the first device, with a corresponding final decision transmitted to an end user by the apparatus, the final decision based on aggregated crowd data of the set of crowdsourcing tasks received by the apparatus;

determining a first set of similarities between the first set of crowdsourcing behaviors and sets of crowdsourcing behaviors of other devices from the plurality of devices;

determining, based on the first set of similarities, whether the first device belongs to a set of collusive attackers in the crowdsourcing network;

in response to a determination that the first device belongs to the set of collusive attackers, excluding the first device from the crowdsourcing network; and, communicating, to a further apparatus, an indication regarding the first device belonging to the set of collusive attackers.

10. The method of claim 9, wherein determining the first set of crowdsourcing behaviors comprises:
in response to the history data associated with a crowdsourcing task being false, determining a corresponding crowdsourcing behavior in the first set of crowdsourcing behaviors to be a first value; and
in response to the history data associated with a further crowdsourcing task being true, determining a further corresponding crowdsourcing behavior in the first set of crowdsourcing behaviors to be a second value different from the first value.

11. The method of claim 9, wherein determining the first set of similarities comprises determining a similarity between the first device and a second device from the plurality of devices by:
determining a total number of crowdsourcing tasks performed by the first and second devices;
determining a first number of crowdsourcing tasks, the first number of crowdsourcing tasks associated with incorrect history data of both the first and second devices;
determining a second number of crowdsourcing tasks, the second number of crowdsourcing tasks being associated with continuously incorrect history data of both the first and second devices; and
determining the similarity based on the total number, the first number, and the second number.

12. The method of claim 11, wherein determining the first set of similarities comprises determining the similarity between the first device and the second device from the plurality of devices by:

$$sim_{ij} = \frac{|1_{ij}| + c_{ij}}{|B_{ij}| + c_{ij}}, |1_{ij}| \le |B_{ij}|,$$

wherein $sim_{ij}$ represents the similarity between the first device and the second device, $B_{ij}$ represents the total number of crowdsourcing tasks performed by the first and second devices, $|1_{ij}|$ represents the first number of crowdsourcing tasks, $c_{ij}$ represents the second number of crowdsourcing tasks, the i represents the first device and the j represents the second device.

13. The method of claim 9, wherein determining whether the first device belongs to the set of collusive attackers comprises:

determining a first distance between the first device and a third device from the plurality of devices based on the first set of similarities and a third set of similarities, the third set of similarities being between a third set of crowdsourcing behaviors of the third device and the sets of crowdsourcing behaviors of other devices from the plurality of devices, the set of collusive attackers comprising the third device;

determining a second distance between the first device and a fourth device from the plurality of devices based on the first set of similarities and a fourth set of similarities, the fourth set of similarities being between a fourth set of crowdsourcing behaviors of the fourth device and the sets of crowdsourcing behaviors of other devices from the plurality of devices, the set of collusive attackers excluding the fourth device; and in response to the first distance exceeding the second distance, determining that the first device belongs to the set of collusive attackers.

14. The method of claim 13, wherein determining whether the first device belongs to the set of collusive attackers comprises:
determining the first distance between the first device and the third device based on the first set of similarities and the third set of similarities by:

$$d_{im} = \frac{1}{n}\sum_{q=1}^{n}(sim_{iq} - sim_{mq})^2,$$

wherein $d_{im}$ represents the first distance, the n represents a number of the plurality of devices, $sim_{iq}$ represents a similarity between the first device and the $q^{th}$ device in the first set of similarities, and $sim_{mq}$ represents a similarity between the third device and the $q^{th}$ device in a second set of similarities.

15. The method of claim 9, wherein determining whether the first device belongs to the set of collusive attackers comprises:
determining a first distance between the first device and a third device based on the first set of similarities and a third set of similarities, the third set of similarities being between a third set of crowdsourcing behaviors of the third device and the sets of crowdsourcing behaviors of other devices from the plurality of devices, the set of collusive attackers comprising the third device; and
in response to the first distance being below a threshold distance, determining that the first device belongs to the set of collusive attackers.

16. The method of claim 9, wherein excluding the first device in the crowdsourcing network comprises:
stopping assigning a further crowdsourcing task to the first device.

17. A non-transitory computer readable medium storing instructions thereon, the instructions, when executed by at least one processing unit of an apparatus, causing the apparatus to:
for a first device from a plurality of devices in a crowdsourcing network, determine a first set of crowdsourcing behaviors of the first device based on a comparison of history data transmitted from the first device to the apparatus, the history data associated with a set of crowdsourcing tasks performed by the first device, with a corresponding final decision transmitted to an end user by the apparatus, the final decision based on aggregated crowd data of the set of crowdsourcing tasks received by the apparatus;
determine a first set of similarities between the first set of crowdsourcing behaviors and sets of crowdsourcing behaviors of other devices from the plurality of devices;
determine, based on the first set of similarities, whether the first device belongs to a set of collusive attackers in the crowdsourcing network;
in response to a determination that the first device belongs to the set of collusive attackers, exclude the first device from the crowdsourcing network; and
communicate, to a further apparatus, an indication regarding the first device belonging to the set of collusive attackers.

18. The non-transitory computer readable medium of claim 17, wherein the apparatus is caused to determine the first set of crowdsourcing behaviors by:
in response to the history data associated with a crowdsourcing task being false, determining a corresponding crowdsourcing behavior in the first set of crowdsourcing behaviors to be a first value; and
in response to the history data associated with a further crowdsourcing task being true, determining a further corresponding crowdsourcing behavior in the first set of crowdsourcing behaviors to be a second value different from the first value.

* * * * *